US007978751B2

(12) United States Patent
Brueninghaus et al.

(10) Patent No.: US 7,978,751 B2
(45) Date of Patent: Jul. 12, 2011

(54) INTERPOLATING GRAKE WITH TWO STEP DELAY HYPOTHESIS TESTING

(75) Inventors: Karsten Brueninghaus, Salzgitter (DE); Oliver Klein, Nuremberg (DE); Jaroslaw Niewczas, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 669 days.

(21) Appl. No.: 12/052,042

(22) Filed: Mar. 20, 2008

(65) Prior Publication Data
US 2009/0190642 A1    Jul. 30, 2009

Related U.S. Application Data

(60) Provisional application No. 61/023,939, filed on Jan. 28, 2008.

(51) Int. Cl.
*H04B 1/06* (2006.01)
*H03K 9/00* (2006.01)
(52) U.S. Cl. ........................ 375/148; 375/316
(58) Field of Classification Search .................. 375/136, 375/142, 147–150, 224, 260–261, 267–268, 375/316, 320, 322, 324–325, 340, 343, 347; 370/345, 458, 335, 342, 441
See application file for complete search history.

(56) References Cited

U.S. PATENT DOCUMENTS

| 6,363,104 | B1 | 3/2002 | Bottomley |
| 2002/0136234 | A1* | 9/2002 | Eriksson et al. ............... 370/458 |
| 2006/0268962 | A1* | 11/2006 | Cairns et al. .................. 375/148 |
| 2009/0268787 | A1* | 10/2009 | Cairns et al. .................. 375/148 |

OTHER PUBLICATIONS

Garrett et al., Multipath Acquisition for Rake Reception in DS Packet Radio Systems, 1998, Military Communications Conference, 1998, MILCOM 98, Proceedings. IEEE, vol. 3, pp. 837-841.*
Bottomley, Gregory E.; Ottosson, Tony; and Wang, Yi-Pin Eric., "A Generalized RAKE Receiver for Interference Suppression," IEEE Journal on Selected Areas in Communications, vol. 18, No. 8, Aug. 2000, pp. 1536-1545.

* cited by examiner

*Primary Examiner* — Tesfaldet Bocure
*Assistant Examiner* — Lawrence B Williams
(74) *Attorney, Agent, or Firm* — Coats & Bennett, P.L.L.C.

(57) ABSTRACT

The present invention provides a method and apparatus for adapting a current path delay estimate for path delay tracking. In order to determine the path delay an operating mode is selected and a set of hypothesized path delays are determined based on said operating mode. A metric for each hypothesized path delay is determined, and a current path delay estimate is adapted based on the computed metrics for the hypothesized path delays.

24 Claims, 9 Drawing Sheets

INTERPOLATING GRAKE WITH TWO STEP DELAY HYPOTHESIS TESTING

RELATED APPLICATION

This application claims the benefit of U.S. Provisional Patent Application 61/023,939, filed Jan. 28, 2008, which is incorporated herein by reference.

BACKGROUND

The present invention relates generally to RAKE receivers for code division multiple access (CDMA) systems, and more particularly, to a method and apparatus for determining the finger placement of RAKE fingers in a RAKE receiver.

In a wireless communication system, a transmitted signal may travel through multiple propagation paths so that the received signal is a composite of multiple time-shifted versions of the signal. The different time-shifted versions of the received signal, referred to herein as signal images, suffer from different phase and attenuation effects. The multiple time-shifted signal images combine in an unpredictable manner resulting in signal fading.

CDMA receivers typically employ a RAKE receiver to combat signal fading due to multi-path propagation. The goal of the RAKE receiver is to detect the individual signal images and combine them coherently. A RAKE receiver typically includes a plurality of correlators, sometimes referred to as fingers, to separately despread different time-shifted signal images, and a combiner to combine the correlator outputs. For example, a RAKE receiver may detect and combine the M strongest signal images. A path searcher processes the received signal to identify the delays corresponding to the strongest signal images, and a finger placement processor determines the finger placement based on those delays. The process of finger placement comprises the assignment of a delay to each RAKE finger to align the RAKE finger in time with a signal image. A simple finger placement strategy is to assign the delays of the J strongest signal images found by the path searcher to respective RAKE fingers.

Typically, finger placement starts by generating an estimated power delay profile (PDP) over a defined search window that gives the signal power as a function of delay. The path searcher measures the signal power of the received signal samples. The spacing between samples defines a search grid and the signal power measurements define the PDP. One approach to finger placement, referred to herein as the "peak" approach, is to place fingers at or near the peaks or local maximas in the PDP. Ideally, the RAKE fingers would be placed at the exact delays corresponding to peaks in the PDP. Exact placement of the RAKE fingers at the peaks of the PDP is not always possible because the search grid does not always align with the peaks in the PDP. The actual peak in the PDP may fall between the grid points of the search grid.

In some circumstances, the path searcher may detect a dominant signal image in the received signal. This situation may occur, for example, when there is a direct line-of-sight path between the transmitter and the receiver, when there is a non-dispersive channel, or when one signal image is much stronger than other signal images. When a dominant signal image exists, the RAKE fingers are typically placed on a finger grid centered on the delay of the dominant signal image reported by the path searcher. Delay hypothesis testing can be used to determine the relative timing delay between the current finger placement and the dirac-like channel impulse response in order to track the path of the dominant signal image. Knowing this relative delay allows for interpolation of despread values at non-sample positions thus increasing the SINR at the output of the combiner compared to non-interpolating schemes.

Conventional methods for delay hypotheses testing suffer from a high computational complexity to achieve a given accuracy with respect to the relative delay estimate. The reason for the computational complexity is that the number of hypotheses to be tested depends on the uncertainty interval of the path searcher result, which is at least based on the sampling period distance and on the required delay resolution. Assuming typical values, i.e., a sampling period distance of ¼ chip duration and a required delay resolution of 1/32 chip to support 64-QAM, 9 different hypotheses needs to be tested.

SUMMARY

One exemplary embodiment of the present invention provides a low complexity method for adapting a current path delay estimate for path delay tracking. The starting path delay estimate may be a previously determined path delay estimate or may be set to the most recent path searcher output to initialize or re-initialize path delay tracking. The method begins by selecting an operating mode. Next, a metric is computed for each hypothesized path delay. Finally, the current estimated path delay is adapted based on the computed metrics for the hypothesized path delays.

In one exemplary embodiment, two modes are contemplated: fine mode and coarse mode. In fine mode, a hypothesized path delay selected based on the computed metrics may be filtered to obtain a filtered delay estimate. In this case, the new path delay estimate is set equal to the filtered delay estimate. In coarse mode, a hypothesized path delay selected based on said computed metrics and an adjacent hypothesized path delay may be interpolated to obtain an interpolated delay estimate. In this case, the new path delay estimate is set equal to said interpolated delay estimate. Interpolation may be conditionally performed depending on whether the selected hypothesized path delay is on an edge of a test window. Also, those skilled in the art will readily appreciate that interpolation may also be used in fine mode to improve accuracy of path delay estimation.

Another exemplary embodiment of the invention provide a receiver having a processor configured to perform delay hypothesis testing for delay tracking. More specifically, the processor is configured to select an operating mode (e.g., fine or coarse), determine a set of hypothesized path delays based on a current path delay estimate and the operating mode, compute a metric for each hypothesized path delay, and adapt said path delay estimate based on said computed metrics for said hypothesized path delays. In some embodiments, the receiver may comprise a RAKE receiver. In other embodiments, the receiver may comprise a chip equalization receiver.

DETAILED DESCRIPTION

The present invention relates to a method and apparatus for determining finger placement in a RAKE receiver or tap delays in a chip equalizer receiver. As used herein, the term RAKE receiver includes a generalized RAKE (G-RAKE) receiver as described in U.S. Pat. No. 6,363,104, which is incorporated herein by reference. The invention has application in single-input single-output (SISO) receivers, multiple-input, single-output (MISO) receivers, single-input, multiple-output (SIMO) receivers, and multiple-input, multiple-output (MIMO) receivers.

Figure 1:
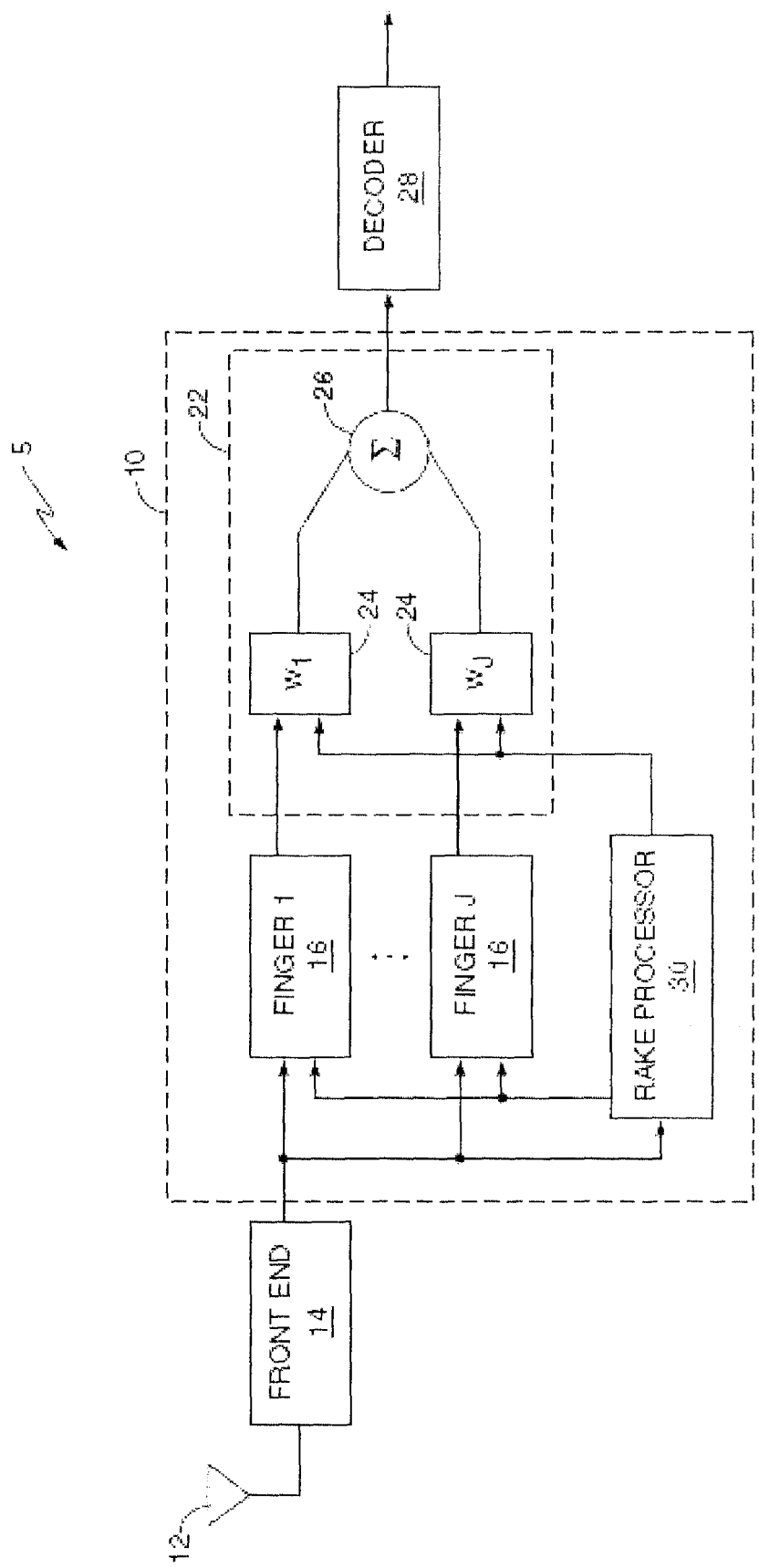
FIG. 1 illustrates a Rake receiver including a Rake processor according to an embodiment of the invention.

FIG. 1 illustrates a wireless receiver 5 including a RAKE receiver 10 according to one exemplary embodiment of the invention. Wireless receiver 5 comprises a receive antenna 12, a receiver front-end 14, a RAKE receiver 10, and a decoder 28. Receiver front-end 14 filters, down-converts, and samples the received signal from antenna 12 to generate a baseband signal for processing. The sampling interval may, for example, be one-half the chip period $T_C$. The signal samples from the receiver front-end 14 are input to RAKE receiver 10. RAKE receiver 10 comprises a RAKE processor 30, a plurality of RAKE fingers 16 to despread selected signal images. In the case of a RAKE receiver, L RAKE fingers 16 are typically assigned to the L strongest signal images, and a weighting network 22 to combine the outputs of the RAKE fingers 16 to generate a combined RAKE output signal. A GRAKE receiver typically includes J>L fingers, with the extra fingers being used for interference cancellation and/or interpolation. Decoder 28 decodes the combined RAKE output signal.

Figure 2:
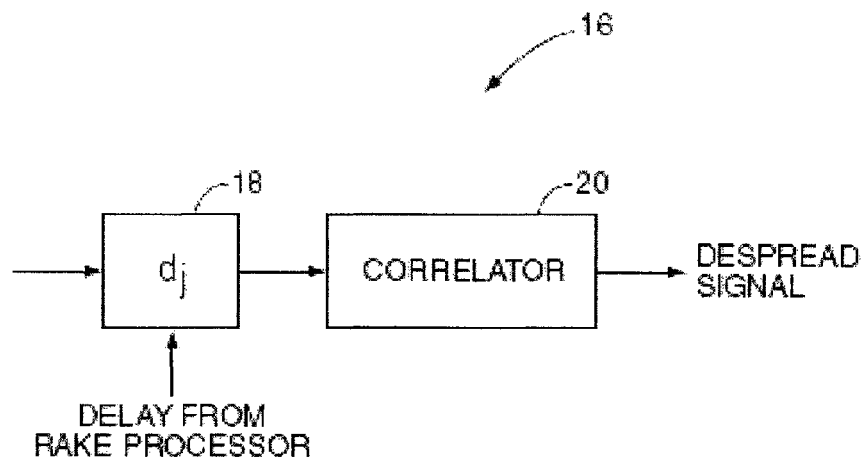
FIG. 2 illustrates a Rake finger for the Rake receiver of FIG. 1.

FIG. 2 illustrates an exemplary RAKE finger 16. RAKE finger 16 comprises a delay element 18 and a correlator 20. The delay element 18 aligns finger 16 with a selected signal image by delaying the received signal by a configurable delay determined by the RAKE processor 30. The correlator 20 correlates the delayed signal with a known spreading sequence associated with a desired signal to despread the received signal. As a result of the correlation process, unwanted signals contained in the received signal appear as noise to the receiver. Weighting network 22 weights and combines the despread signals output from the individual RAKE fingers 16. Weighting elements 24 apply a weighting coefficient to respective RAKE finger outputs, and RAKE combiner 26 combines the weighted RAKE output signals to generate a combined decision statistic, referred to herein as the RAKE output signal. The RAKE output signal is applied to decoder 28, which decodes the RAKE output signal to generate an estimate of the originally transmitted signal.

Figure 4:
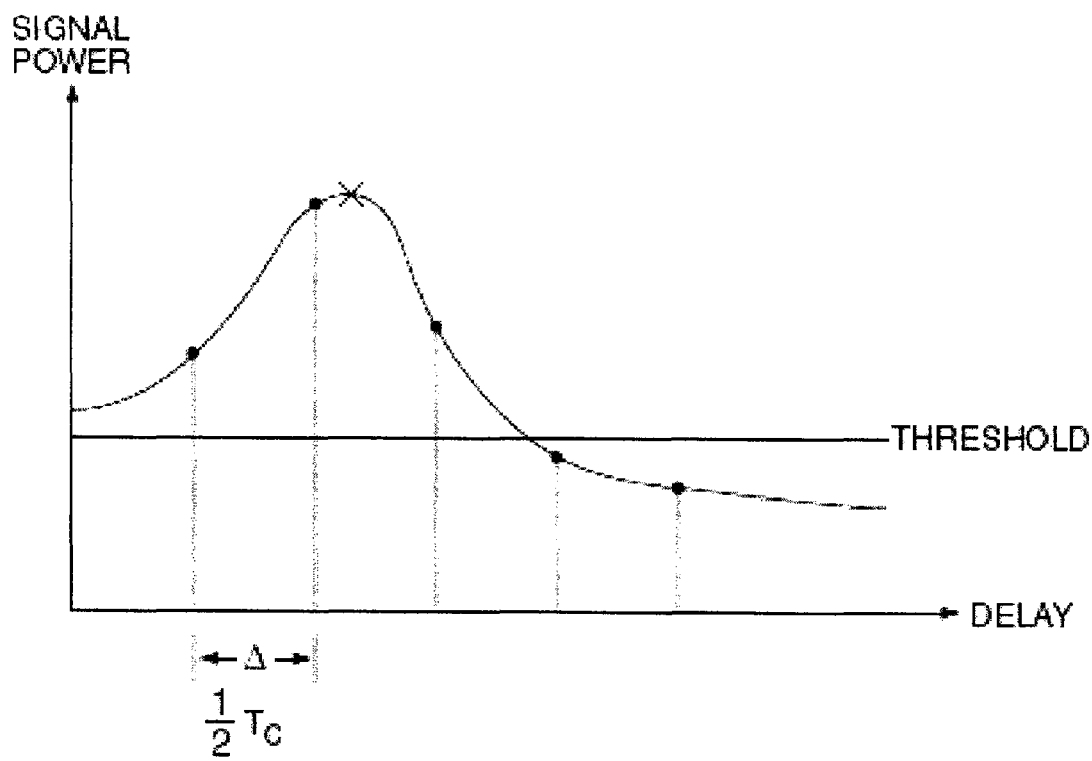
FIG. 4 illustrates an exemplary power delay profile used by a path searcher of a RAKE receiver to identify signal images in a received composite signal.
Figure 3:
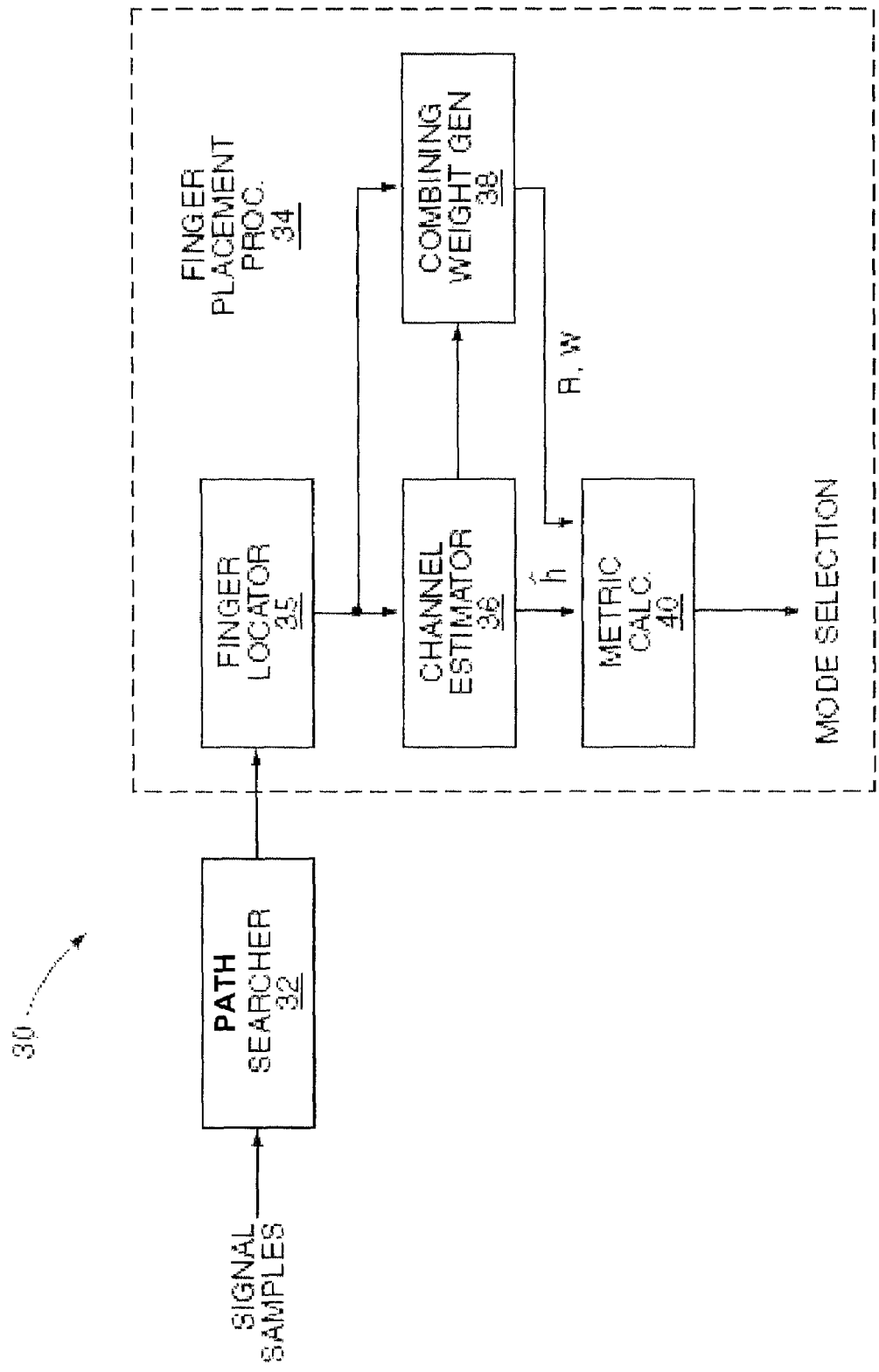
FIG. 3 illustrates the Rake processor of FIG. 1.

RAKE processor 30 determines the number and placement of the RAKE fingers 16 and the combining weights applied to the individual RAKE finger outputs by weighting elements 24. FIG. 3 illustrates a RAKE processor 30 according to one exemplary embodiment of the invention. RAKE processor 30 comprises a path searcher 32 and finger placement processor 34. Path searcher 32 identifies the individual signal images in a received signal and determines the delay associated with each signal image. More particularly, the path searcher 32 generates a power delay profile, such as shown in FIG. 4, by measuring the signal power of the received signal samples over a predetermined search window. The sampling interval may be one chip period or less. FIG. 4 illustrates a power delay profile assuming a one-half chip interval ($\frac{1}{2}T_c$) between signal samples. One approach to detecting the signal images detects local maxima in the PDP and compares the local maxima to a defined threshold. The delays of these local maximas are taken as the path delays of the signal images in the received multi-path signal. The path delays of the detected signal images are input to the finger placement processor 34. The finger placement processor 34 determines the number and placement of RAKE fingers 16 based on the path delay estimates provided by the path searcher 32. Additionally, the finger placement processor 34 calculates weighting coefficients to be applied to the individual RAKE finger outputs by weighting elements 24.

Finger placement processor 34 includes a finger locator 35, channel estimator 36, combining weight generator 38, and metric calculator 40. The finger locator 35 determines the locations of the RAKE fingers 16 based on the estimated path delays reported by the path searcher 32. In a conventional RAKE receiver, a RAKE finger 16 is typically assigned to the L strongest delays. In a G-RAKE receiver, additional RAKE fingers 16 may be used to detect the received signals that do not correspond to any path delay. The channel estimator 36 generates estimates of the propagation channel from the transmitter to the receiver 5 for each assigned RAKE finger 16. The channel estimates are provided to the combining weight generator 38. Combining weight generator 38 computes the combining weights applied to the RAKE finger outputs. The combining weight generator 38 may, for example, compute combining weights based on a maximal ratio combining (MRC) criteria. For MRC combining, the combining weights are based upon the signal power or signal power to interference power ratio (SIR) at the output of the correlator 20 for each RAKE finger 16. If the SIR for a particular RAKE finger 16 is low, it will be assigned a low weighting factor. Conversely, if the SIR for a particular RAKE finger 16 is high, it will be assigned a large weighting factor. With full G-RAKE combining, the combining weight generator 38 computes impairment correlations across the RAKE fingers 16 and generates an impairment covariance matrix R. The combining weight generator 38 multiplies the vector of channel estimates ĥ from the channel estimator 36 by the inverse of the impairment covariance matrix R to generate a weight vector w, whose elements are the weighting factors for the outputs of RAKE fingers 16.

In some circumstances, path searcher 32 may detect a dominant signal image in the received signal. This situation may occur, for example, when there is a direct line-of-sight path between the transmitter and the receiver. A dominant signal image will exist if there is only one detected signal image indicating a non-dispersive channel. If the channel is dispersive and more than one signal image is detected, the presence of a dominant signal image may be determined based on the relative signal power or SIR of the detected signal images. If the signal power or SIR of the strongest signal image exceeds all others by a predetermined amount, then a dominant signal image may be deemed to exist.

When a dominant signal image exists, RAKE fingers 16 are typically placed on a finger grid centered on the delay of the dominant signal image reported by the path searcher 32. Delay hypothesis testing may be used to determine the relative timing delay between the current finger placement and the dirac-like channel impulse response in order to track the path of the dominant signal image. An exemplary method of delay hypothesis testing is described in U.S. Published Patent Application No. 2006/0268962, which is incorporated herein by reference. The present invention provides a low complexity method of performing delay hypothesis testing.

Figure 5:
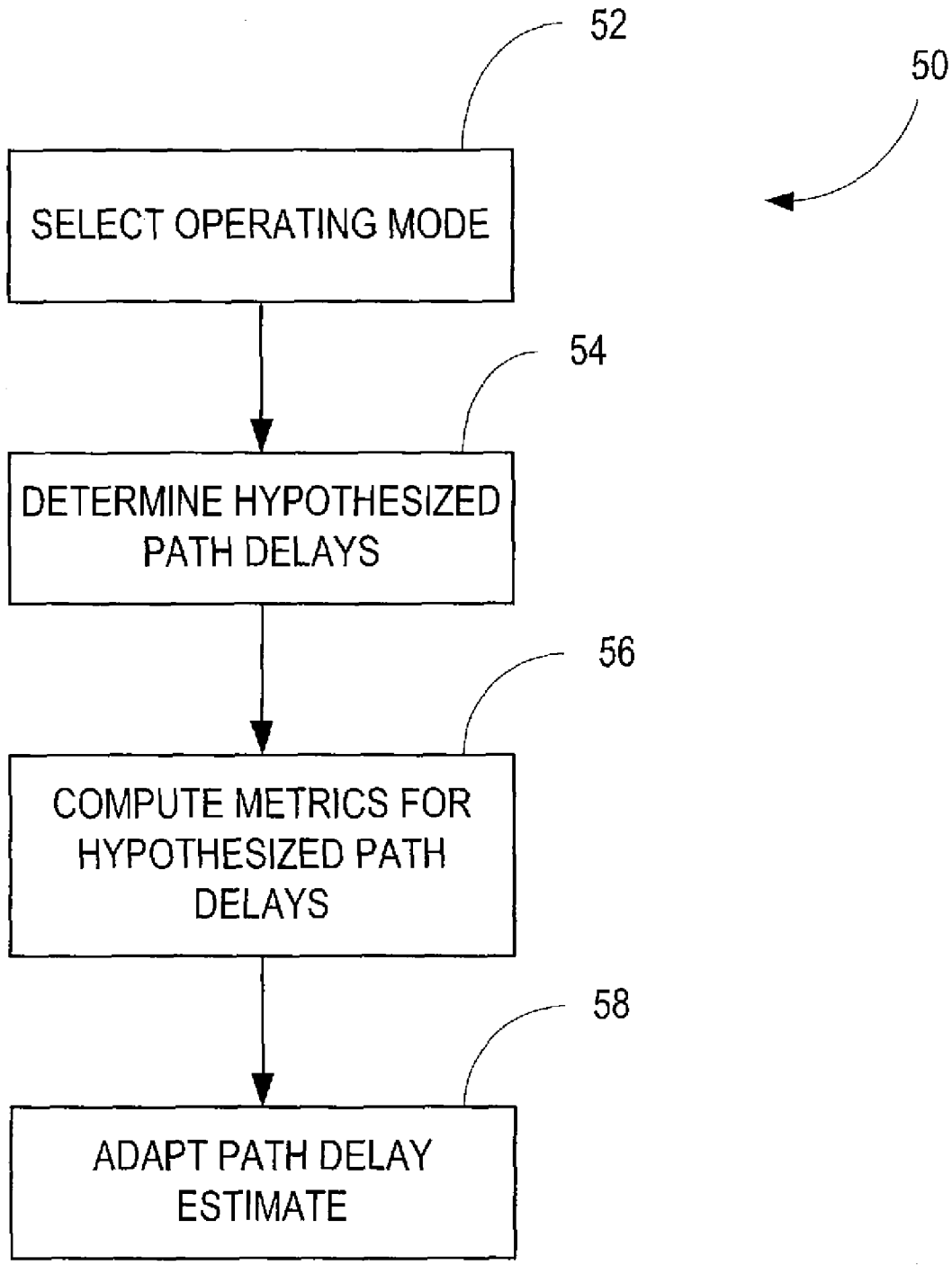
FIG. 5 illustrates an exemplary method for adapting a current path delay estimate.

FIG. 5 provides a broad overview of an exemplary method 50 implemented by the RAKE processor 30 for adapting a current path delay estimate $\tau_{min}(s)$ for a slot number s, which may be a previously determined path delay estimate or may be set to the most recent path searcher output to initialize or re-initialize delay tracking. The method begins by selecting an operating mode (block 52). In the exemplary embodiment, only two mode are contemplated; a coarse mode and a fine mode. However, there may be embodiments where more than two modes are used. Once the mode is selected, a set of hypothesized path delays is determined based at least in part on the selected mode (block 54). The timing of the hypothesized path delays is determined from the current path delay estimate. Next, a metric is computed for each hypothesized path delay (block 56). In the exemplary embodiment, the metric is a distance metric. However, other metrics may be used. Finally, the current estimated path delay estimate is adapted based on the computed hypothesized path delay (block 58).

In fine mode, a hypothesized path delay selected based on the computed metrics may be filtered to obtain a filtered delay estimate. In this case, the new path delay estimate is set equal to the filtered and possibly quantized delay estimate. If quantization is used, the quantization levels may have a higher resolution than the sampling period. In coarse mode, a hypothesized path delay selected based on said computed metrics and adjacent hypothesized path delay may be interpolated to obtain an interpolated delay estimate. In this case, the new path delay estimate is set equal to said interpolated delay estimate. Interpolation may be conditionally performed depending on whether the selected hypothesized path delay is on an edge of a test window. Also, those skilled in the art will readily appreciate that interpolation may also be used in fine mode to improve accuracy of path delay estimation.

Figure 6A:
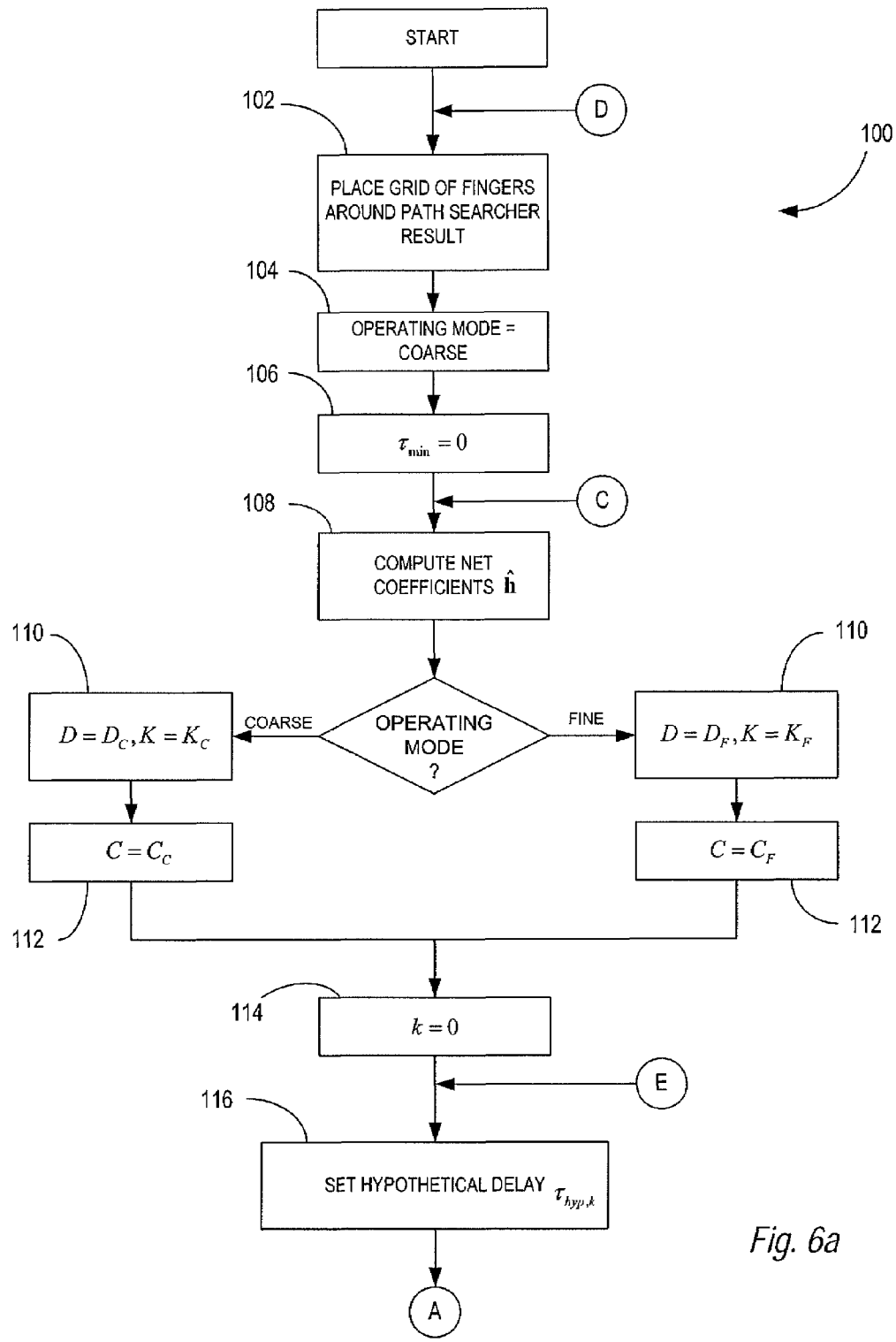
FIGS. 6A-6C illustrates in more detail an exemplary method for adapting a current path delay estimate.
Figure 6B:
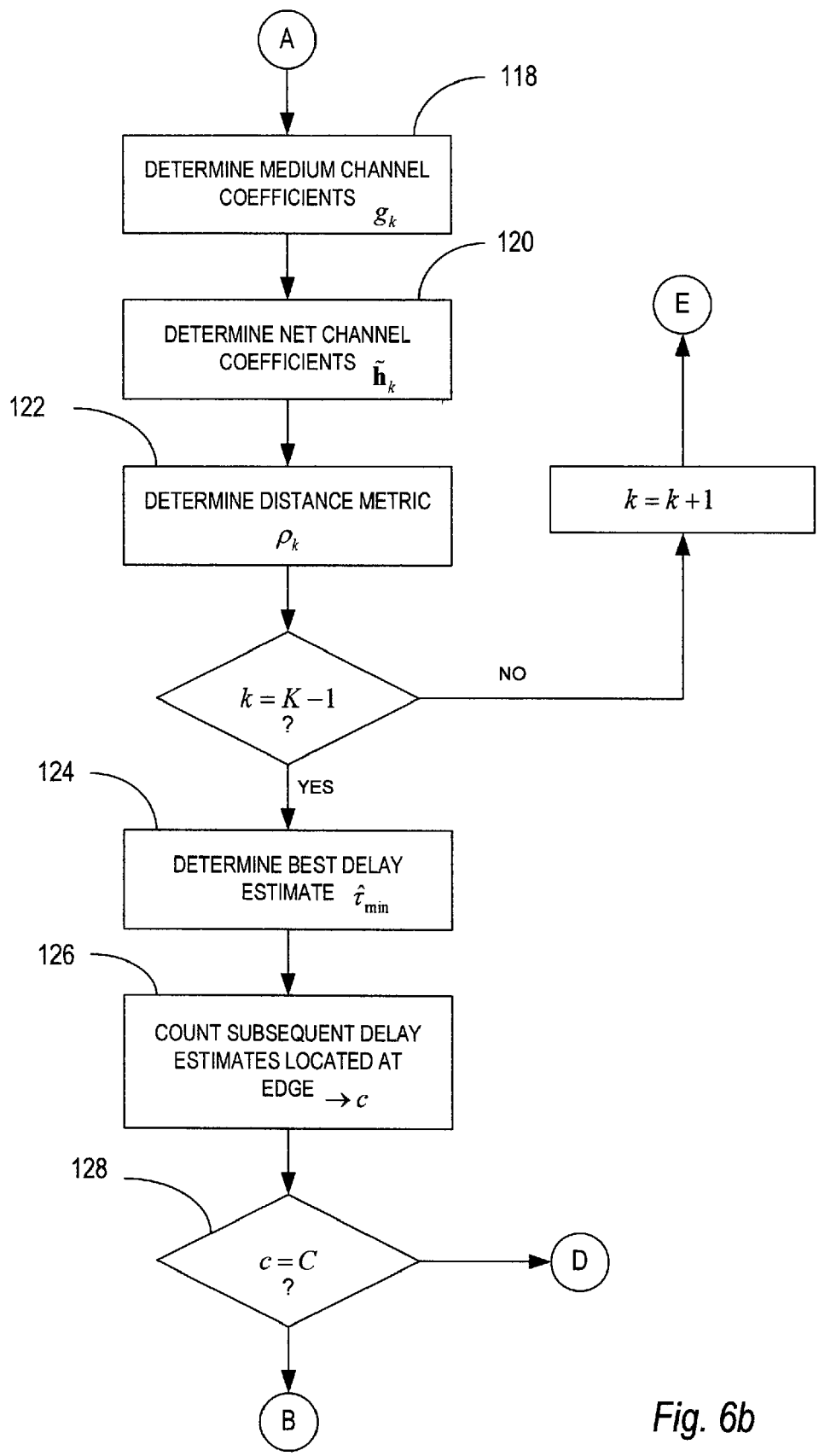
Figure 6C:
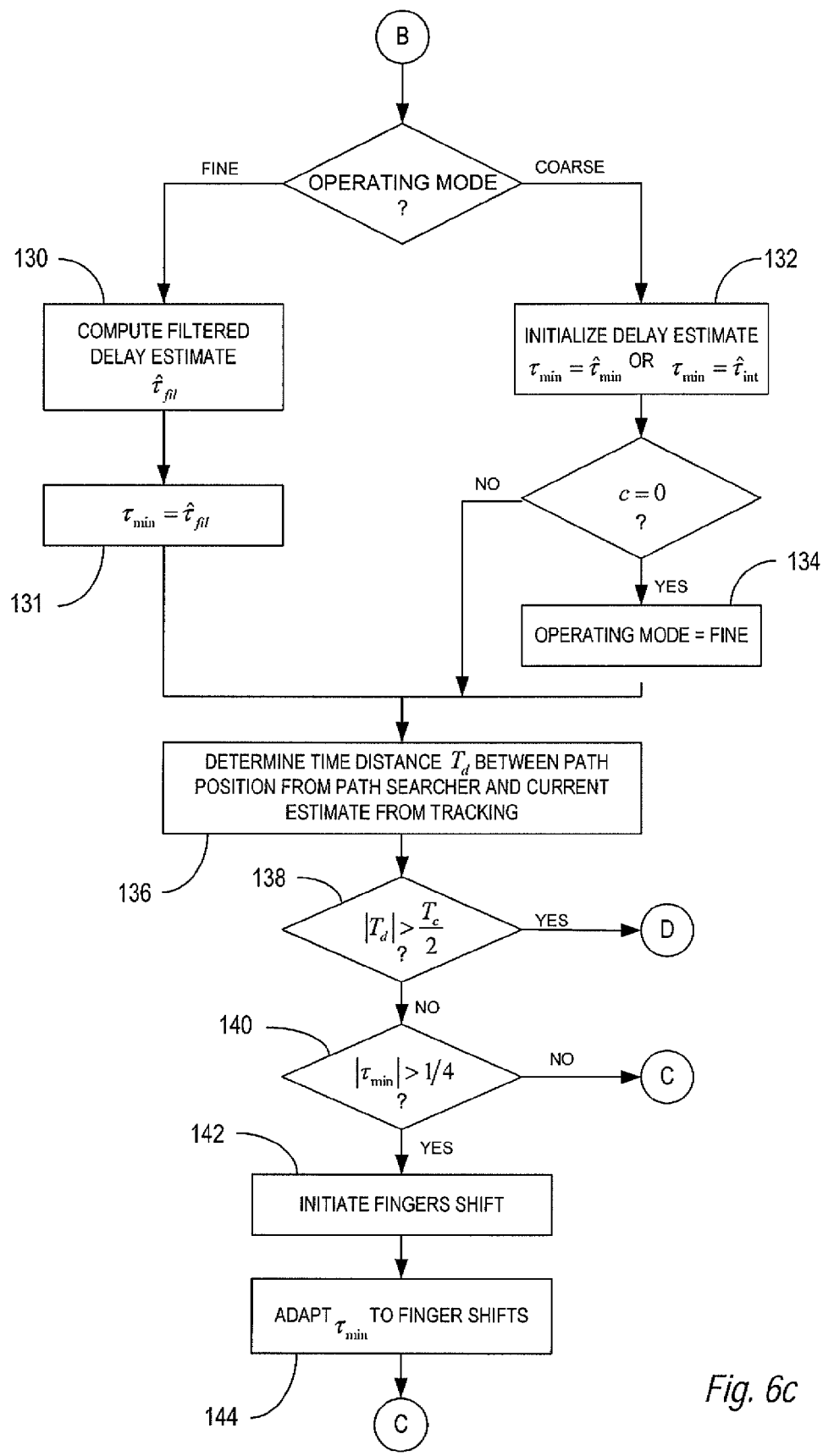

FIGS. 6A-6C illustrates in more detail one exemplary method 100 implemented by the RAKE processor 30 for adapting a current path delay estimate $\tau_{min}(s)$. To facilitate the discussion, some boxes have been labeled and are described in detail. Boxes which are not labeled are regarded as being clear from the short description within the box. They are mainly related to initialization or incrementing of status variables or counters, respectively.

For illustrative reasons and without loss of generality it is assumed that six fingers (F=6) spaced at a distance of $$\Delta = \frac{1}{2} T_C$$

are used for CPICH cross correlation of the WCDMA Common Pilot Channel (CPICH), where $T_C$ is the chip period. The sampling interval is $$\frac{1}{4} T_c.$$

Figure 7:
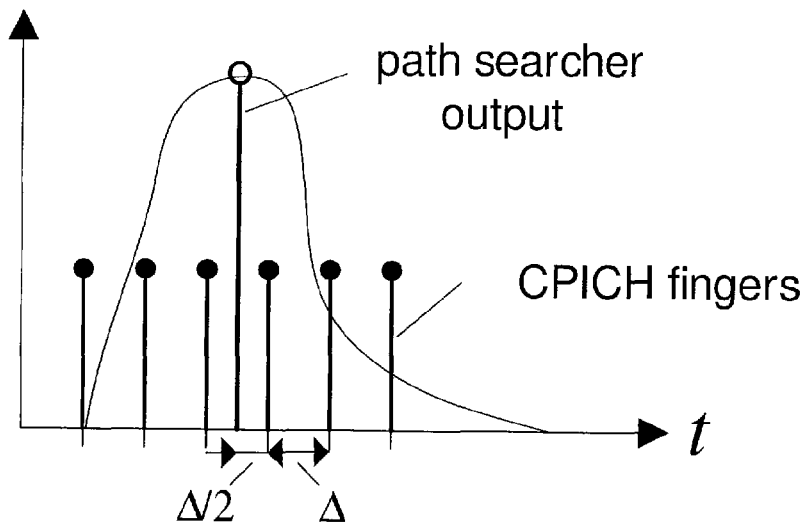
FIG. 7 illustrates an initial finger placement around a path searcher result.

The Rake fingers 16 are initially placed around the path searcher result as shown in FIG. 7, e.g., the grid of fingers is centered around the estimated (single or dominant) channel path delay provided by the path searcher (block $$(K_C - 1) \cdot D_C = \frac{6}{8} 102).$$

The processing is then started by setting the operating mode to coarse (block 104) and initializing the current path delay estimate $\tau_{min}(s)$ (block 106).

Before delay hypotheses testing begins, net channel estimates ĥ are computed by removing the pilot sequence s(m) from the CPICH cross-correlation results x(m) (block 108). Averaging over e.g., ten subsequent estimates yields an estimated channel response vector ĥ(s) as follows:

$$\hat{h}(s) = \frac{1}{10} \sum_{m=0}^{9} x(m) s^*(m) = \frac{1}{10} \sum_{m=0}^{9} h(m). \quad (1)$$

Like x(m), the vector ĥ(s) is a complex-valued column vector having six elements.

Figure 8:
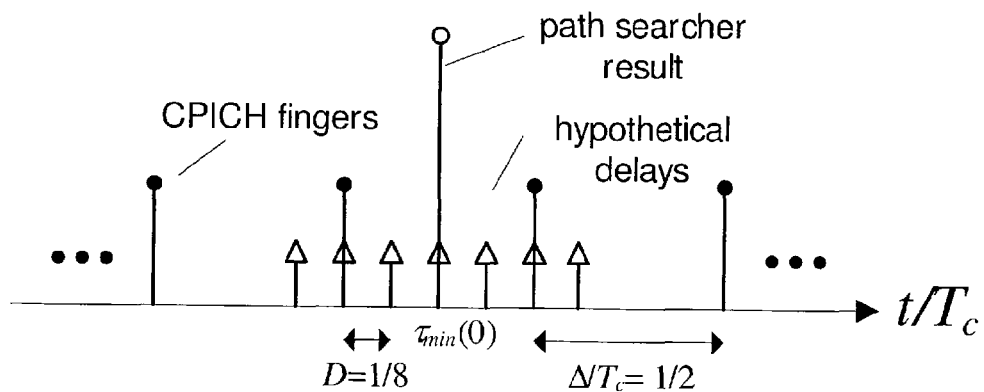
FIG. 8 illustrates a set of hypothetical delays for coarse mode processing considering $\Delta=\frac{1}{2}T_c$.
Figure 9:
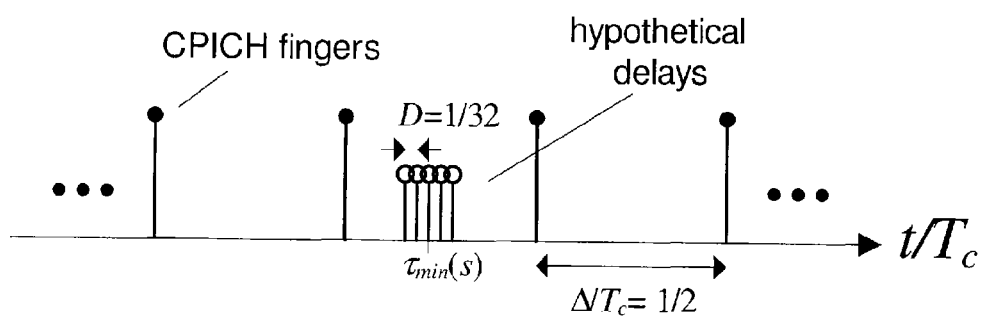
FIG. 9 illustrates a set of hypothetical delays for fine mode processing considering $\Delta=\frac{1}{2}T_c$.

The number K and a delay resolution or distance D (normalized with respect to the chip period $T_C$) of delay hypotheses tests is initialized depending on the operating mode (block 110). In coarse mode, which is the initial mode, the distance D is generally larger to cover a wider uncertainty interval with a comparable (or equal) number of tests as in fine mode. FIGS. 8 and 9 illustrate exemplary sets of hypothesized path delays for coarse mode and fine mode respectively. Using $K_C=7$ and $$D_C = \frac{1}{8}$$

in coarse mode and $K_F=5$ and $$D_F = \frac{1}{32}$$

in fine mode demonstrates realistic figures. The uncertainty interval covered amounts to three-fourths of a chip period $$\left((K_C - 1) \cdot D_C = \frac{6}{8}\right)$$

in coarse and one eighth of a chip period $$\left((K_F - 1) \cdot D_F = \frac{1}{8}\right)$$

in fine mode. A need for that may either be caused by bad path searcher accuracy, especially in case of MIMO. Since the path searcher 32 generally determines the delay between a specific transmitter/receiver (Tx/Rx) antenna pair, radio frequency (RF), or propagation delay differences in other Tx/Rx pairs have to be taken into account as additional uncertainty. Note that due to these differences in case of MIMO, delay hypotheses testing needs to be done for each Tx/Rx antenna combination independently. In fine mode, the test window is reduced compared to coarse mode since the channel path delay is generally slowly time varying.

A variable C is also initialized independently for both the coarse and fine operating modes (block 112). The variable C is a threshold that is used to determine when delay hypothesis testing needs to be re-initialized as hereinafter described.

Delay hypothesis testing begins by setting the loop counter k=0 (block 114). Hypothetical delays $\tau_{hyp,k}(s)$ for current slots (slot number s) are set depending on the initialization of K and D (block 116). Hypotheses testing is centered around the previously estimated, quantized path delay $\tau_{min}(s-1)$ at slot number s−1:

$$\tau_{hyp,k}(s) = Q_{\frac{1}{64}}\{\tau_{min}(s-1)\} - \frac{K-1-2k}{2}D \quad k \in \{0,1,\ldots,K-1\}. \quad (2)$$

Quantization is performed with an even finer resolution than fine delay hypotheses testing. Thus, the maximum error may be further decreased from 1/64 to 1/128 without an increase in complexity.

The set of hypothetic delays $\tau_{hyp,k}(s)$ for all k∈{0, 1, ..., K−1} is depicted in FIG. 8 (coarse mode) and FIG. 9 (fine mode). In coarse mode, the normalized offset values are {−3,−2,−1,0,1,2,3}·⅛ and in fine mode {−2,−1,0,1,2}1/32, respectively. Delay hypotheses testing is initialized to run in coarse mode with $\tau_{min}(0)$=0. The position $\tau_{min}(0)$=0 is by definition the path searcher channel delay estimate. Unlike dynamic test grid positioning with a normalized resolution of 1/64 and a variable delay distance depending on the mode, the exemplary method for delay hypothesis testing uses a fixed grid approach wherein the delay hypotheses $\tau_{hyp,k}(s)$ are determined according to:

$$\tau_{hyp,k}(s) = \frac{K-1-2k}{2}D. \quad (3)$$

A medium channel coefficient g(k) is computed for each hypothetical delay $\tau_{hyp,k}(s)$ according to:

$$g_k = r_{k,inv}\tilde{h}(s), \quad (4)$$

where $r_{k,inv}$ is pseudo inverse of the real valued vector of overall transmit and receiver filter impulse response $r_k$ at each finger position (block 118). The pseudo inverse $r_{k,inv}$ of the filter impulse response may be computed according to:

$$r_{k,inv} = (r_k^H r_k)^{-1} r_k^H. \quad (5)$$

The vector $r_k$ is defined by:

$$r_k = \begin{pmatrix} \varphi(-2.5\Delta + \tau_{hyp,k}T_c) \\ \varphi(-1.5\Delta + \tau_{hyp,k}T_c) \\ \varphi(-0.5\Delta + \tau_{hyp,k}T_c) \\ \varphi(0.5\Delta + \tau_{hyp,k}T_c) \\ \varphi(1.5\Delta + \tau_{hyp,k}T_c) \\ \varphi(2.5\Delta + \tau_{hyp,k}T_c) \end{pmatrix}, \text{ where} \quad (6)$$

$$\varphi(t) = \int_{-\infty}^{\infty} p(t+\tau)p(\tau)d\tau \quad (7)$$

is the autocorrelation function for the combined transmit and receive filters. Due to quantization of $\tau_{hyp,k}(s)$ to multiples of 1/64, the number of different vectors $r_{k,inv}$ is limited and may be read from a look-up table.

The hypothetical net channel coefficients $\tilde{h}_k$ for the current hypothetical delay $\tau_{hyp,k}$ are computed using the previously estimated medium channel coefficient g(k) and the overall filter response $r_k$ (block 120). The hypothetical net channel coefficients $\tilde{h}_k$ may be computed according to:

$$\tilde{h}_k = g_k r_k. \quad (8)$$

A distance metric $\rho_k$ is computed for each delay hypothesis (block 122). The distance metric may be computed according to:

$$\rho_k = (\hat{h}(s) - \tilde{h}_k)^H R_N^{-1} (\hat{h}(s) - \tilde{h}_k) \quad (9)$$

using the inverse of the autocorrelation matrix of thermal noise $R_N^{-1}$. Those skilled in the art will appreciate that other metrics may be used in place of or in addition to the distance metric $\rho_k$ to evaluate delay hypotheses. After the metrics are computed, the computed metrics are used to adapt the current path delay estimate $\tau_{min}(s)$.

Adaptation of the current path delay estimate $\tau_{min}(s)$ begins by selecting a best path delay estimate $\hat{\tau}_{min}(s)$ based on the computed metric $\rho_k$ (block 124). The best path delay estimate $\hat{\tau}_{min}(s)$ is defined by:

$$\hat{k} = \underset{k}{\arg\min}\{\rho_k\} \quad (10)$$

$$\hat{\tau}_{min}(s) = \tau_{hyp,\hat{k}}(s).$$

Applying equation (10) in coarse mode provides more inaccurate estimates due to the larger hypotheses test distance. However, this initial inaccuracy may be reduced considerably by means of interpolation. Provided that $\rho_{\hat{k}-1},\rho_{\hat{k}+1}$ exists, e.g., $\hat{k}\neq 0$ and $\hat{k}\neq K-1$, an interpolated path delay estimate $\hat{\tau}_{int}(s)$ may be computed by adding an offset $\tau_{offs}(s)$ to the best path delay estimate $\hat{\tau}_{min}(s)$. The offset $\tau_{offs}(s)$ is defined by:

$$\tau_{offs}(s) = \frac{\delta_{\rho-} - \delta_{\rho+}}{\delta_{\rho-} + \delta_{\rho+}} \cdot \frac{D}{2} \text{ with} \quad (11)$$

$$\delta_{\rho-} = \rho_{\hat{k}-1} - \rho_{\hat{k}}$$

$$\delta_{\rho+} = \rho_{\hat{k}+1} - \rho_{\hat{k}},$$

and the interpolated path delay estimate becomes:

$$\hat{\tau}_{int}(s) = \hat{\tau}_{min}(s) + \tau_{offs}(s). \quad (12)$$

Equation (10) is only used as fallback in the coarse operating mode in case the best path delay estimate $\hat{\tau}_{min}(s)$ falls on the edge of the test window, e.g., $\hat{k}$=0 or $\hat{k}$=K−1. If desired, interpolation may also be performed in fine mode to improve the accuracy of the estimate.

After the best path delay estimate $\hat{\tau}_{min}(s)$ or interpolated delay estimate $\hat{\tau}_{int}(s)$ is determined, the internal counter variable c is incremented if the instantaneous (best or interpolated) path delay estimate $\hat{\tau}_{min}(s)$ or $\hat{\tau}_{min}(s)$ from the delay hypotheses testing lies at the edge of the test window, or it is reset to zero otherwise (block 128). If C subsequent delay estimates are located at the edge of the test window, the current assumption for the dominant path position may be wrong and the entire delay hypothesis testing procedure is reinitialized. This means that the finger position delivered from the path searcher 32 will be the new starting point for next round of delay hypotheses testing. Note that the parameter C may be configured independently for each mode. For coarse mode, the variable C=$C_C$ and for fine mode the variable C=$C_F$.

In the fine operating mode, the best path delay estimate $\hat{\tau}_{min}(s)$ or interpolated estimate $\hat{\tau}_{int}(s)$ obtained from delay hypothesis testing is filtered by an infinite impulse response (IIR) filter or low pass filter to obtain a filtered path delay estimate $\hat{\tau}_{fil}(s)$ (block 130). The filter process may be given by:

$$\hat{\tau}_{fil}(s) = \hat{\tau}_{fil}(s-1) + \alpha[\hat{\tau}_{min}(s) - \hat{\tau}_{fil}(s-1)]. \quad (13)$$

or alternatively by:

$$\hat{\tau}_{fil}(s) = \hat{\tau}_{fil}(s-1) + \alpha[\hat{\tau}_{int}(s) - \hat{\tau}_{fil}(s-1)] \quad (14)$$

The new path delay estimate $\tau_{min}(s)$ is set equal to the filtered path delay estimate $\hat{\tau}_{fil}(s)$ to complete the adaptation of the current path delay estimate (block 131).

In coarse mode, the new path delay estimate $\tau_{min}(s)$ is set equal to the interpolated path delay estimate $\hat{\tau}_{int}(s)$ if available or the best path delay estimate $\hat{\tau}_{min}(s)$ if an interpolated path delay estimate $\hat{\tau}min(s)$ is not available (block 132). Note that setting the new path delay also initializes the filter for the next iteration of delay hypothesis testing. Further note that as long as delay hypotheses testing remains in coarse mode (when $\hat{\tau}_{min}(s)$ is at the edge of the test window), the IIR filter is reinitialized over and over again until $\hat{\tau}_{min}(s)$ lies inside the test window. If in coarse operating mode and the delay estimate $\hat{\tau}_{min}(s)$ is inside the test window, e.g., $\hat{k} \neq 0$ or $\hat{k} \neq K-1$, the operating mode is changed to fine (block 134).

Before the next iteration of delay hypothesis testing starts, the new path delay estimate $\tau_{min}(s)$ is compared to the path searcher output and adaptation of the finger positions is made if needed. Note that the rate of adaptation may be greater than the rate at which the path searcher 32 outputs new path delay estimates. For example, adaptation may take place once per slot and the path searcher 32 may output a new estimate every 240 slots. Finger adaptation begins by comparing the distance $T_D$ measured in time between the most recent path delay output by the path searcher 32 and the new path delay estimate $\tau_{min}(s)$ (block 136), and comparing the computed distance to the chip period $T_C$ (block 138). If the delay is greater than one half the chip period $T_C$, the current assumption for the dominant path position may be wrong and the next round of delay hypothesis testing begins by re-centering the finger grid on the output of the path searcher (block 102). Next, it is checked whether the absolute value of the new path delay estimate $\tau_{min}(s)$ exceeds ¼ of a chip period $T_C$ (block 140). When the absolute value of the new path delay estimate $\tau_{min}(s)$ exceeds ¼ of a chip period $T_C$, the true, e.g., denormalized, value exceeds the sampling distance $T_s$. In this case, a finger shift is invoked externally and the new path delay estimate $\tau_{min}(s)$ is adapted accordingly (blocks 142, 144). To be more precise, if $\tau_{min}(s) > ¼$, the fingers shall be shifted by $+T_s$, and if $\tau_{min}(s) < -¼$, the fingers shall be shifted by $-T_s$ (block 144) and $\tau_{min}(s)$ is recomputed by:

$$\tau_{min}(s) = \tau_{min}(s) - \text{sgn}\{\tau_{min}(s)\}\frac{1}{4}. \quad (15)$$

Following the finger adaptation, the next round of delay hypothesis testing begins with the computation of net channel coefficients (block 108).

The present invention provides a reduction in computational complexity and a reduction of the maximum and mean delay estimation error. The reduction in complexity is achieved using two operation modes (coarse and fine) with different resolutions for delay hypotheses testing. Initially, when there is a large uncertainty where the true channel path is located, the coarse mode allows for evaluating this large uncertainty interval with relatively few hypotheses tests. For example having an uncertainty interval of ± a quarter of a chip period would require seventeen hypothesis tests to be performed if the high resolution testing grid with a distance of 1/32 chip period is used from the beginning. Starting with a grid resolution of ⅛ chip period reduces the number of required tests. The inherent loss in resolution is overcome by interpolation between distance metrics. Positioning the delay hypotheses test window around the current (filtered) delay estimate also allows for minimizing the number of hypotheses to be considered.

A reduction of the maximum and mean delay estimation error is achieved by using a higher resolution for the position of the testing grid than for the testing grid itself. For example, using a testing grid with a resolution of 1/32 chip period and positioning this grid only at delays being an integer multiple of this period yields a maximum potential error of 1/64 chip period (half the resolution). Letting the grid be positioned at multiples of 1/64 chip period, for example, reduces the maximum potential error to 1/128 of a chip period without needing more hypothesis tests.

Figure 10:
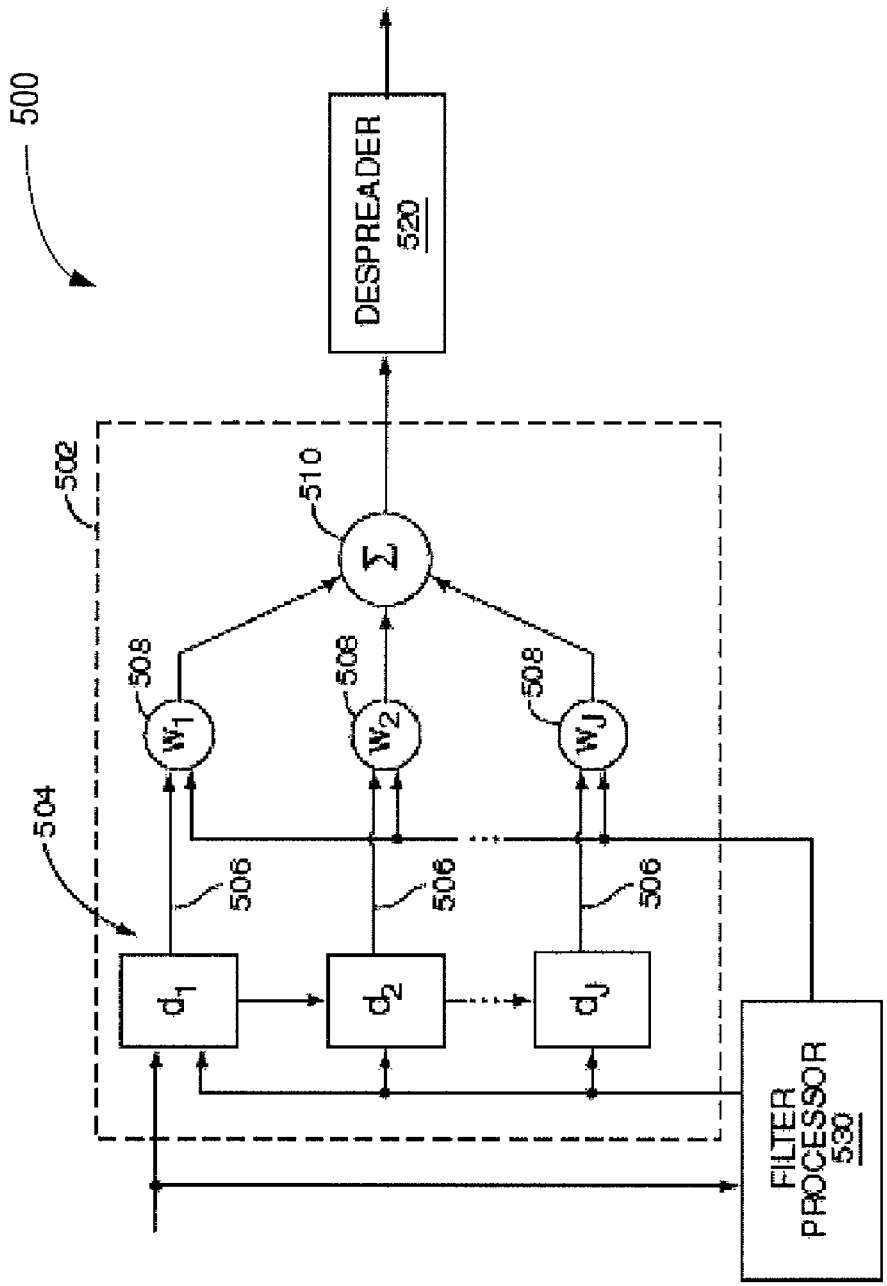
FIG. 10 is a functional block diagram of a chip equalization receiver.

Those skilled in the art will appreciate that G-RAKE processing is equivalent to linear minimum mean square error (LMMSE) based chip equalization (CE). FIG. 10 illustrates a chip equalization receiver 500 according to one embodiment of the invention. The chip equalization receiver 500 comprises an equalizer filter 502, despreader 520, and filter processor 530. The equalizer filter 502 filters the received signal samples before despreading to generate a filtered signal. The equalizer filter 502 comprises an FIR filter comprising delay elements 504 with J taps 506. The tap outputs 506 may be weighted by weighting elements 508 and combined by a combiner 510. Alternatively, combiner 510 may combine the tap outputs 506 directly. The filtered signal is then despread by despreader 520. Those skilled in the art will appreciate that the despreader 520, while illustrated downstream of the combiner 510, may be moved ahead of the combiner 510 in some embodiments. Filter processor 530 determines the tap delays and filter coefficients for the equalizer filter 502. The tap delays correspond to the previously discussed finger delays, and the filter coefficients correspond to the previously discussed combining weights. As with the RAKE receiver embodiment, the filter processor 530 performs the delay hypothesis testing as described above to determine the tap delays.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented in a receiver of adapting a path delay estimate, said method comprising:
   selecting an operating mode to be one of a coarse mode and a fine mode;
   determining a set of hypothesized path delays based on a current path delay estimate and said operating mode, said set of hypothesized path delays having a delay resolution determined based on the selected operating mode;
   computing a metric for each hypothesized path delay; and
   adapting said path delay estimate based on said computed metrics for said hypothesized path delays.

2. The method of claim 1 further comprising switching to a coarse operating mode if said hypothesized path delays are on an edge of a test window and switching to a fine operating mode if said hypothesized path delays are not on an edge of said test window.

3. The method of claim 1 wherein determining a set of hypothesized path delays based on a current path delay estimate and said operating mode comprises determining a number and delay resolution of said hypothesized path delays based on said operating mode.

4. The method of claim 1 wherein computing a metric for each hypothesized path delay comprises computing a distance metric for each hypothesized path delay.

5. The method of claim 1 wherein adapting said path delay estimate comprises filtering a hypothesized path delay selected based on said computed metrics to obtain a filtered delay estimate and setting said path delay estimate equal to said filtered delay estimate.

6. The method of claim 1 wherein adapting said path delay estimate comprises interpolating between a hypothesized path delay selected based on said computed metrics and one or more adjacent hypothesized path delays to obtain an interpolated delay estimate and setting said path delay estimate equal to said interpolated delay estimate.

7. The method of claim 6 wherein interpolating between a selected hypothesized path delay and one or more adjacent hypothesized path delays is conditioned on the selected hypothesized path delay not being on the edge of a test window.

8. The method of claim 7 wherein adapting said path delay estimate comprises setting the path delay estimate equal to the selected hypothesized path delay in coarse mode when the selected hypothesized path delay is on the edge of a test window.

9. The method of claim 1 wherein adapting said path delay estimate comprises interpolating between a hypothesized path delay selected based on said computed metrics and one or more adjacent hypothesized path delays to obtain an interpolated delay estimate, filtering the interpolated delay estimate to obtain a filtered delay estimate, and setting said path delay estimate equal to said filtered delay estimate.

10. The method of claim 9 wherein said filtered delay estimated is a quantized filtered delay estimate.

11. The method of claim 1 wherein said receiver comprises a RAKE receiver.

12. The method of claim 1 wherein said receiver comprises a chip equalization receiver.

13. A receiver comprising:
  a receiver front end for receiving signals transmitted over a communication channel; and
  a processor connected to said receiver front end and configured to:
    select an operating mode to be one of a coarse mode and a fine mode;
    determine a set of hypothesized path delays based on a current path delay estimate and said operating mode, said set of hypothesized path delays having a delay resolution determined based on the selected operating mode;
    compute a metric for each hypothesized path delay; and
    adapt said path delay estimate based on said computed metrics for said hypothesized path delays.

14. The receiver of claim 13 wherein said processor is configured to switch to a coarse operating mode if said hypothesized path delays are is on an edge of a test window and to switch to a fine operating mode if said hypothesized path delays are not on an edge of said test window.

15. The receiver of claim 13 wherein said processor is configured to determine a number and delay resolution of said hypothesized path delays based on said operating mode and determine a timing of said hypothesized path delays based on said current path delay estimate.

16. The receiver of claim 13 wherein said processor is configured to compute a distance metric for each hypothesized path delay.

17. The receiver of claim 13 wherein said processor is configured to adapt said path delay estimate by filtering a hypothesized path delay selected based on said computed metrics to obtain a filtered delay estimate and setting said path delay estimate equal to said filtered delay estimate.

18. The receiver of claim 13 wherein said processor is configured to adapt said path delay estimate by interpolating between a hypothesized path delay selected based on said computed metrics and an adjacent hypothesized path delay to obtain an interpolated delay estimate and setting said path delay estimate equal to said interpolated delay estimate.

19. The receiver of claim 18 wherein said processor is configured to interpolate between a selected hypothesized path delay and one or more adjacent hypothesized path delays on the condition that the selected hypothesized path delay is not on the edge of a test window.

20. The receiver of claim 19 wherein said processor is configured to adapt said path delay estimate by setting the path delay estimate equal to the selected hypothesized path delay in coarse mode when the selected hypothesized path delay is on the edge of a test window.

21. The receiver of claim 13 wherein said processor is configured to adapt said path delay estimate by interpolating between a hypothesized path delay selected based on said computed metrics and one or more adjacent hypothesized path delays to obtain an interpolated delay estimate, filtering the interpolated delay estimate to obtain a filtered delay estimate, and setting said path delay estimate equal to said filtered delay estimate.

22. The receiver of claim 21 wherein said processor is further configured to quantize the filtered delay estimate.

23. The receiver of claim 13 wherein said receiver comprises a RAKE receiver.

24. The receiver of claim 13 wherein said receiver comprises a chip equalization receiver.

* * * * *

UNITED STATES PATENT AND TRADEMARK OFFICE
CERTIFICATE OF CORRECTION

PATENT NO. : 7,978,751 B2
APPLICATION NO. : 12/052042
DATED : July 12, 2011
INVENTOR(S) : Brueninghaus et al.

It is certified that error appears in the above-identified patent and that said Letters Patent is hereby corrected as shown below:

On the Title Page Item (75), under "Inventors", Line 3, delete "Nümberg" and insert -- Nuremberg --, therefor.

In Column 7, Line 25, delete "$\{-2,-1,0,1,2\}^{1/32}$," and insert -- $\{-2,-1,0,1,2\} \cdot 1/32$, --, therefor.

In Column 8, Line 56, delete the second occurrence of "$\tilde{\tau}_{min}(s)$" and insert -- $\hat{\tau}_{int}(s)$ --, therefor.

In Column 9, Line 18, delete "$\tilde{\tau}min(s)$," and insert -- $\hat{\tau}_{int}(s)$ --, therefor.

In Column 12, Line 9, in Claim 14, after "are" delete "is".

Signed and Sealed this
Thirteenth Day of December, 2011

David J. Kappos
*Director of the United States Patent and Trademark Office*